United States Patent Office 2,720,537
Patented Oct. 11, 1955

2,720,537

SEPARATION OF MAHOGANY ACIDS ACCORDING TO MOLECULAR WEIGHT

Esbon Y. Titus, Chicago, and Charles Wankat, Brookfield, Ill., assignors to Universal Oil Products Company, Chicago, Ill., a corporation of Delaware No Drawing. Application September 5, 1952, Serial No. 308,153

10 Claims. (Cl. 260—504)

This invention relates to a process for separating a mixture of mahogany sulfonic acids into one fraction comprising the low molecular weight components of the mixture and another fraction comprising the components of the mixture having relatively high molecular weights in comparison to the first-mentioned fraction, said higher molecular weight mahogany acids generally being of greater utility than the acids of lower molecular weight. In its more specific aspects, the present invention relates to a method of classifying and recovering the sulfonic acids of a given mixture of mahogany sulfonic acids into two fractions of different average molecular weights utilizing a process which comprises contacting the mixture of mahogany acids with a solid adsorbent which adsorbs the mixture of sulfonic acids and thereafter mixing the resulting adsorbent containing the acids adsorbed thereon with an organic oxygen-containing solvent which selectively removes a fraction of acids from the adsorbent comprising the higher molecular weight members of the mixture.

The treatment of oils, and particularly the fractions of petroleum containing the white medicinal oils of paraffinic and naphthenic structure with concentrated or fuming sulfuric acid results in the production of sulfonic acids, a portion of which remain dissolved in the unreacted mineral oil and another portion of which remain in the acid treating agent. The sulfonic acids which remain in solution in the oil impart a reddish color to the oil and are generally referred to as "mahogany sulfonic acids." According to general practice, the mahogany acids are recovered from the acid treated mineral oil by extraction from the oil with an aqueous solution or suspension of a suitable alkaline material, such as an aqueous sodium hydroxide solution of about 5° Bé. strength, thereby converting mahogany acids to the corresponding alkali soaps which dissolve in the aqueous solution. The latter aqueous phase is usually separated from the unreacted mineral oil by decantation therefrom and the alkali metal soaps are recovered from the aqueous solution by "salting out" the soaps with a strong caustic solution, generally of from about 40 to 50 Bé. strength. Due to the strong emulsifying properties of the mahogany acid soaps, the soaps thus recovered generally contain a considerable proportion of the original hydrocarbon oil from which the acids are recovered, and may contain up to from about 50 to about 75% of such hydrocarbons. The free mahogany acids may be recovered from the soap by acidifying the latter with a strong mineral acid, such as sulfuric acid. The economic value of mahogany acids is substantially greater in the form of a particular acid free from the hydrocarbon contaminants. Of the raw mixture of acids thus recovered, the higher molecular weight mahogany sulfonic acids are of generally greater utility for use as emulsifying agents, detergents, etc. The present invention provides a means not only of purifying the recovered mahogany acids of hydrocarbon contaminants which ordinarily accompany the acids in the recovery procedure, but also for the separation of the higher molecular weight components of the mixture of mahogany acids from the low molecular weight components of said mixture.

In one of its embodiments, the present invention concerns a process for separating a crude mixture of mahogany sulfonic acids into a first fraction comprising the components of highest molecular weight present in said mixture and a second fraction comprising the components of lower molecular weight present in said mixture, said process comprising contacting said mixture of sulfonic acids with a solid adsorbent capable of adsorbing said acids thereon, washing the resultant adsorbent-sulfonic acid mixture with an eluting agent for the high molecular weight fraction of mahogany acids contained in said combination at a temperature and pressure sufficient to maintain said eluting agent in substantially liquid phase, said eluting agent being selected from the oxygen-containing organic compounds having not more than about 5 carbon atoms per molecule.

A more specific embodiment of the invention relates to a process for fractionating a crude mixture of mahogany sulfonic acids into a relatively high molecular weight fraction and a relatively low molecular weight fraction which comprises dissolving said crude mixture of mahogany sulfonic acids in a paraffinic hydrocarbon containing from 3 to about 8 carbon atoms per molecule, mixing the resulting sulfonic acid solution with a solid adsorbent having the capacity to adsorb thereon the sulfonic acids from said hydrocarbon solution, mixing the adsorbent containing adsorbed sulfonic acids with an alcohol selected from the $C_1$–$C_5$ monohydric alcohols utilizing from about 0.5 to 1 to about 10 to 1 volume proportions of alcohol to sulfonic acids in the sulfonic acid-adsorbent mixture at a temperature and pressure sufficient to maintain said alcohol in substantially liquid phase, thereafter recovering an alcohol solution of the relatively high molecular weight fraction of mahogany sulfonic acid from spent adsorbent which retains the relatively low molecular weight fraction of mahogany sulfonic acids.

The mixture of mahogany sulfonic acids utilized as feed stock in the present separation process are produced as by-products of the treatment of mineral oils of petroleum origin with concentrated sulfuric acid, oleum, or other sulfonating agent in the manufacture of white oils. In the production of these oils, a petroleum distillate, usually a fraction boiling above the kerosene boiling range and generally a lubricating oil fraction, is treated under relatively drastic conditions of temperature and strong sulfonating reagents with generally not more than about 50% by volume of the sulfonating agent, at a temperature generally not exceeding about 80° C. and usually by stepwise addition of the sulfonating agent in several dumps. The sludge formed in the sulfonation separates from the unreacted oil and is recovered therefrom by settling followed by decantation. The sulfonic acids desired as feed stock in the present process remain dissolved in the unreacted oil and are usually recovered therefrom by extraction with an aqueous alkaline solution, or suspension of alkaline material, such as aqueous caustic, to form the aforementioned mahogany soaps. The mahogany acid may be regenerated by re-acidification of the caustic extract, resulting in the production of a dark-red, oily mixture of mahogany acids of varying molecular weight.

The mahogany acids thus formed are essentially naphthenic and/or aromatic in character, contain one or more sulfonic acid radicals attached to the hydrocarbon ring and are true sulfonic acids rather than alkyl sulfates or alkyl hydrogen sulfate esters. As previously indicated, the higher molecular components of the crude mixture of mahogany sulfonic acids are considered to be of greater value and of greater utility for more varied applications and it therefore becomes desirable to provide a means for segregating the relatively high molecular weight components of the mixture from the components of relatively low molecular weight. In the process of the present invention this separation is accomplished by contacting the crude mixture of sulfonic acids (which generally contains some of the mineral oil from which the acids were prepared) with a solid adsorbent having the ability to adsorb all of the sulfonic acids in the crude mixture and thereafter eluting the high molecular weight components as a fraction from the adsorbent-mahogany acid combination with a solvent selected from the group characterized generally as the low molecular weight oxygen-containing organic compounds. In order to more effectively disperse the crude mixture of mahogany acids with the solid adsorbent and dilute the hydrocarbon contaminants of the crude acids the latter are preferably dissolved in a relatively low viscosity low boiling hydrocarbon solvent prior to contacting the same with the solid adsorbent. The resulting solution flows more freely through the adsorbent because of the greater fluidity of the crude mahogany acids, the solvent facilitating the present separation process, in the presence of the porous adsorbent. For this purpose, a light hydrocarbon liquid, herein referred to as a hydrocarbon which is fluid or free-flowing at the conditions selected for the separation process and which has a relatively low boiling point is utilized to dissolve the crude mixture of mahogany sulfonic acids prior to contact thereof with the solid adsorbent.

The low viscosity, volatile liquid hydrocarbon solvents utilizable for this purpose include the liquefied normally gaseous hydrocarbons, such as liquid propane, liquid butane, or a mixture of propane and butanes and also n-pentane and isopentane, the normal and iso-hexanes, heptanes, octanes, and mixtures of one or more of the above, such as a petroleum naphtha boiling up to about 150° C., benzene, toluene, xylene, etc. or a liquid, fluid halogenated hydrocarbon analog of the low molecular weight members of the above group, such as carbon tetrachloride, ethylene dichloride, ethylene dibromide, trichloroethane, etc. In general, the crude mahogany acids are sufficiently diluted when mixed with from about 0.5 to about 10 or more volumes of the low viscosity hydrocarbon solvent per volume of the mixed acids, although more or less of the solvent may be employed in any particular operation to provide a liquid, fluid mixture to be contacted with the solid absorbent.

In accordance with the first step of the present separation process, the crude mahogany acids which may be, and preferably are, diluted with the aforementioned low viscosity, volatile hydrocarbon solvent are mixed with a solid adsorbent, preferably in finely divided condition, said adsorbent being selected from certain solid materials which retain in their porous structure the mahogany sulfonic acids contacted therewith. Suitable solid adsorbents for this purpose are selected from several general classes of materials including the activated carbons or charcoals, siliceous materials of either substantially pure silica or the activated aluminum silicate types of materials and activated alumina of either natural or synthetic origin. Suitable activated carbons may be prepared from various wood charcoals, from other synthetic materials such as cotton linters or from charcoals activated by high temperature treatment, acid treatment or by other means of activation. Suitable solid adsorbents include also the adsorbent clays which may be activated, for example, by high temperature treatment or by treatment with acids, naturally occurring alumina such as bauxite, bentonite, montmorillonite, or a synthetically produced alumina prepared by precipitating aluminum hydroxide gel from the aqueous solution of one of the aluminum salts, such as aluminum chloride, the gel being thereafter calcined at a temperature of from about 200 to about 350° C. to form the activated alumina. Siliceous adsorbents such as the naturally occurring alumino-silicates, among which are the naturally occurring clays such as kieselguhr, fuller's earth, Attapulgus clays and other clays of diatomaceous origin, are suitable adsorbents for use in the present separation process. Another preferred type of solid adsorbent which is active insofar as adsorbing the present mahogany sulfonic acids thereon are the synthetically prepared silica gels formed by precipitation of silicic acid from an alkali metal or alcohol silicate ester utilizing an acid precipitant, followed by drying and calcining of the precipitated silica gel, the procedures for the preparation of which are well known in the art.

The separation of the crude mixture of mahogany sulfonic acids into fractions is effected by mixing the solid adsorbent with either the mahogany acids themselves recovered from the acidified caustic extract of the acid-treated mineral oil or with the acid-treated mineral oil itself prior to any recovery of the mahogany acids from the sulfonated mineral oil. In the treatment of the recovered mahogany acids, the acid is preferably diluted with from 0.5 to about 10 volumes of the aforementioned relatively volatile, fluid hydrocarbon solvent and thereafter mixed from about 0.1 to about 40 pounds of solid adsorbent per thousand pounds of the hydrocarbon-diluted mahogany acids, sufficient to provide a ratio of solid adsorbent to mahogany acid of from about 0.1 to 1 to about 5 to 1 pounds of solid adsorbent per pound of acid adsorbed on the solid adsorbent. The method of mixing the acid with the solid adsorbent may be effected by various means, either by direct addition of the solid adsorbent in the form of a dry powder to the acid-treated mineral oil containing the mahogany acid feed stock, or to a solution of the mahogany acids in the volatile, fluid hydrocarbon solvent, such as a liquid pentane. In another method of effecting the adsorption, the hydrocarbon solution of the mahogany acids (in the form of either the acid-treated mineral oil or the dilute solution of mahogany acids in the low viscosity hydrocarbon solvent) may be initially mixed with the solid adsorbent to form a thin paste and the latter paste thereafter added to the remaining portion of mahogany acids to be treated. The solid adsorbent containing adsorbed thereon the mahogany acids contained in the feed stock is then separated from the non-adsorbed oil or hydrocarbon diluent by filtering, settling, centrifuging or by other means of separating the solid portion of the mixture from the liquid portion. Suitable temperatures for this stage of the operation may be from 0° to about 100° C., the choice of temperature depending upon whether the hydrocarbon diluent mixed with the mahogany sulfonic acids is a relatively viscous liquid at lower temperatures or whether a volatile hydrocarbon solvent is utilized, making the use of high temperatures to reduce the viscosity of the unadsorbed oil or hydrocarbon portion of the feed stock unnecessary. The preferred temperatures for the adsorption stage of the process for most solid adsorbents and for most hydrocarbon diluents is from about 20° to about 50° C. One of the most effective methods of adsorbing the mixture of mahogany acids on the solid adsorbent comprises diluting the mahogany acids or the acid-treated mineral oil fraction with several volumes of one or more of the aforementioned fluid hydrocarbon solvents and percolating the latter solution through a vertical column of the solid adsorbent maintained as a stationary bed within the column, the hydrocarbon-diluted mahogany acid feed stock being forced either downwardly or upwardly through the stationary bed of solid adsorbent.

Following the treatment of the mahogany acid feed stock with the solid adsorbent, the spent solid adsorbing agent containing adsorbed thereon the mixture of mahogany sulfonic acids is thereafter treated with an eluting agent (generally selected from the oxygen-containing organic compounds) at a temperature of from about 10° to about 120° C., preferably from about 30° to about 60° C. and at a pressure sufficient to maintain the organic components in substantially liquid phase. This treatment has been found to effect the selective removal of the higher molecular weight mahogany acid components from the mixed acids adsorbed on the solid adsorbent, thereby providing a method of separating, by elution, a mahogany sulfonic acid fraction consisting of the relatively high molecular weight components from the lower molecular weight mahogany acids, present in the mixture adsorbed on the solid adsorbent. In this stage of the treatment, sufficient oxygen-containing organic solvent is utilized in the elution to provide a liquid solution containing the high molecular weight fraction of acids which is readily separable from the remaining solid adsorbent. The elution process is desirably effected with a sufficient volume of the oxygen-containing organic solvent to remove completely the eluted high molecular weight sulfonic acids from the remaining spent solid adsorbent, leaving no substantial quantity of high molecular weight acids entrained within the porous structure of the solid adsorbent. One of the more convenient means of effecting such complete removal of the high molecular weight mahogany acid fraction from the spent adsorbent involves the aforementioned use of a vertical bed of solid adsorbent, the oxygen-containing organic solvent being passed through the spent adsorbent containing the adsorbed mixture of mahogany acids thereon and continuing the passage of the oxygen-containing organic eluting agent through the vertical bed of spent adsorbent until the effluent stream of eluting agent contains no substantial proportion of desorbed mahogany acids dissolved therein. Alternatively, the mahogany acid-adsorbent mixture may be treated batchwise with several successive aliquots of eluting agent, the solution of eluting agent and selectively desorbed high molecular weight mahogany acid being removed after each aliquot treatment. The desired relatively high molecular weight fraction of mahogany sulfonic acids may then be recovered from the eluting agent by evaporation of the latter from the mahogany acid solution thereof.

The normally liquid oxygen-containing organic compounds utilized in the present process as eluting agents, acting in the capacity of solvents for the relatively high molecular weight fraction of mahogany acids adsorbed on the spent solid adsorbent are compounds having the above-indicated solvent properties and which are fluid (i. e. non-viscous) at the elution temperature and which may be readily recovered from the extract produced. They include such classes of compounds as the alcohols, ketones, ethers, esters, and the mixed ether-alcohols, the compounds, in general, having relatively high oxygen to carbon atomic ratios and generally contain not more than about 5 carbon atoms per molecule. Typical representative compounds in each class enumerated above are such alcohols as methanol, ethanol, propanol, isopropanol, n-butyl alcohol, sec-butyl alcohol, tert-butyl alcohol and the amyl alcohol isomers, including aqueous alcohols containing up to about 50% by weight of water. Typical ketones utilizable as solvent-eluting agents are acetone, methylethylketone, diethylketone, etc.; typical ethers are dimethyl ether, methylene ether, diethylether, methylpropyl ether and ethylpropyl ether; typical esters include methylformate, ethylformate, and the higher alcohol esters of formic acid, up to and including the various isomeric amyl alcohol esters; the acetates, including the methyl, ethyl, propyl, butyl and amyl esters and the propionates of alcohols from methyl to amyl alcohol. The preferred solvents of the above types are the low molecular weight compounds which are relatively volatile and which may be readily separated from the sulphonic acids dissolved from the spent adsorbing agent by simple distillation and which are relatively fluid at the temperature employed for the elution step. Among the above enumerated compounds, the simple alcohols such as methanol and ethanol, acetone and the simple esters such as methyl formate and methyl acetate are the preferred solvents for effecting the desired elution.

The low molecular fraction of mahogany sulfonic acids remaining adsorbed on the solid adsorbent following the elution of the higher molecular weight fraction therefrom with the organic oxygen-containing solvent may be recovered from the adsorbent, if desired, by extraction therefrom with an aqueous solvent, preferably containing a basic neutralizing agent which converts the low molecular weight fraction of adsorbed acids to the corresponding mahogany soaps thereof. The latter soaps dissolve in the aqueous sulfonic acids and may be re-precipitated therefrom by acidifying the recovered aqueous solution. Suitable basic neutralizing agents which may be added to the aqueous solution employed for extracting the low molecular weight mahogany acids from the adsorbent may be ammonium hydroxide, sodium hydroxide, potassium hydroxide, an amine such as diethylamine, pyridine, etc., dissolved in the aqueous solution in an amount sufficient to neutralize the remaining low molecular weight fraction of sulfonic acids on the solid adsorbent. A convenient means for recovering the latter mahogany acid soaps comprises adding the aqueous wash to the spent solid adsorbent from which high molecular weight mahogany acid components have been eluted, in an amount sufficient to form a slurry therewith and thereafter separating the washed solid adsorbent from the aqueous solution of mahogany acid soaps, for example by filtering, centrifuging, or settling.

The present invention is further illustrated with respect to certain specific embodiments thereof in the following example which, however, is not intended to restrict the generally broad scope of the invention necessarily in accordance therewith.

A mixture of crude mahogany sulfonic acids was prepared by reacting a heavy naphtha fraction boiling from about 95° to about 200° C. of a thermally cracked California gas oil fraction with 20% by volume of fuming sulfuric acid and extracting the mahogany acids from the unreacted pressure distillate with a 10% aqueous solution of caustic, followed by acidification of the caustic extract with hydrochloric acid and separation of the insoluble mahogany sulfonic acid phase from the aqueous sulfonic acids. The crude mahogany acids recovered from the acid treatment were diluted with 3 volumes of n-pentane (approximately 4 gallons) and the resulting mixture passed upwardly through a column of 30–60 mesh Attapulgus clay (grade "AA") maintained in a vertical glass tube about 120 cm. in height, and about 5 cm. in diameter and filled with approximately 3 pounds of the solid adsorbent, the resulting weight ratio of adsorbent clay to mahogany acids being approximately 1 to 1. The "spent" adsorbent containing adsorbed mahogany acids thereon was thereafter washed with approximately two gallons of n-pentane and the washings added to the non-adsorbed effluent from the column. The pentane solution when distilled from the column effluent deposited no detectable quantity of mahogany sulfonic acids. The spent adsorbent containing adsorbed mahogany acids was thereafter eluted by passing 2 volumes of methanol at 40° C., downwardly through the column, and collecting the methanol effluent from the column. The eluted adsorbent was separately reserved for subsequent treatment. The methanol solution comprising the column effluent was distilled to remove methanol and to recover a residue comprising mahogany sulfonic acids which have a molecular weight (combining weight) of 530, as determined by electrometric titration. A similar molecular weight determination on the crude mixture of mahogany acids indicated that the mixed acids have an average molecular weight of 465, thus indicating a concentration of the higher molecular weight acid components of the crude mahogany sulfonic acid mixture in the methanol extract recovered from the spent, solid adsorbent. The spent clay was removed from the column following the elution with methanol, mixed with a 10% aqueous caustic solution, the resulting slurry filtered, and the aqueous filtrate acidified to a pH of 5 with dilute hydrochloric acid. A molecular weight determination of the recovered acids by the electrometric titration method indicated that the mahogany acids recovered from the elutriated spent adsorbent have a molecular weight of approximately 405.

We claim as our invention:

1. A process for the recovery of a more valuable product from a crude mixture of mahogany sulfonic acids and hydrocarbons, which comprises contacting the mixture with a solid adsorbent and adsorbing substantially all of said mahogany acids in the adsorbent, thereafter washing the solid adsorbent with an oxygen-containing organic solvent containing not more than about 5 carbon atoms per molecule, thereby selectively eluting from the adsorbent a portion of said mahogany acids which is soluble in said solvent, and separating said portion of the mahogany acids from the resultant solution.

2. The process of claim 1 further characterized in that said solid adsorbent is an adsorbent clay.

3. The process of claim 1 further characterized in that said crude mixture of mahogany sulfonic acids is dissolved in a liquid hydrocarbon prior to contacting said crude mixture of sulfonic acids with said solid adsorbent.

4. The process of claim 3 further characterized in that said liquid hydrocarbon is selected from the group consisting of liquid propane, a butane, a pentane isomer, a hexane isomer and mixtures thereof.

5. The process of claim 1 further characterized in that said oxygen-containing organic solvent is an alcohol containing not more than about 5 carbon atoms per molecule.

6. The process of claim 5 further characterized in that said alcohol is methanol.

7. The process of claim 5 further characterized in that said alcohol is ethanol.

8. The process of claim 1 further characterized in that the adsorbent-sulfonic acid mixture is washed with from about 0.5 to 1 to about 10 to 1 volume proportions of said oxygen-containing organic compound, said volume proportion being based upon the volume of sulfonic acids adsorbed on said adsorbent.

9. A process which comprises dissolving a crude mixture of mahogany sulfonic acids in a paraffinic hydrocarbon solvent containing from 3 to about 8 carbon atoms per molecule, contacting the resulting sulfonic acid solution with adsorbent clay and adsorbing in the latter substantially all of said mahogany acids from said solution, washing the resultant sulfonic acids-containing clay with a mono-hydric alcohol containing not more than 5 carbon atoms per molecule, thereby selectively eluting from the clay an alcohol-soluble portion of said mahogany acids, and recovering said portion of the mahogany acids from the resultant alcoholic solution.

10. The process of claim 9 further characterized in that said sulfonic acids-containing clay is washed with from about 0.5 to 1 to about 10 to 1 volume proportions of said alcohol per volume of adsorbed sulfonic acids.

References Cited in the file of this patent

UNITED STATES PATENTS

| | | |
|---|---|---|
| 1,709,149 | Phillips et al. | Apr. 16, 1929 |
| 2,388,677 | Cohen | Nov. 13, 1945 |
| 2,403,185 | Lemmon et al. | July 2, 1946 |
| 2,413,311 | Cohen | Dec. 31, 1946 |
| 2,535,784 | Cohen | Dec. 26, 1950 |